United States Patent
Kokes et al.

(10) Patent No.: US 11,648,938 B2
(45) Date of Patent: May 16, 2023

(54) BRAKING DATA MAPPING (71) Applicant: Toyota Motor North America, Inc., Plano, TX (US)

(72) Inventors: Nathan Kokes, Frisco, TX (US); Jonathan Spilman, McKinney, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 212 days.

(21) Appl. No.: 16/591,246

(22) Filed: Oct. 2, 2019

(65) Prior Publication Data
US 2021/0101592 A1 Apr. 8, 2021

(51) Int. Cl.
| | |
|---|---|
| *B60W 30/095* | (2012.01) |
| *B60T 7/22* | (2006.01) |
| *B60T 8/40* | (2006.01) |
| *B60W 50/00* | (2006.01) |
| *G06V 20/58* | (2022.01) |
| *G08G 1/01* | (2006.01) |
| *G08G 1/16* | (2006.01) |
| *G05D 1/00* | (2006.01) |
| G06V 20/56 | (2022.01) |
| B60W 40/04 | (2006.01) |
| B60T 7/18 | (2006.01) |
| G08G 1/04 | (2006.01) |
| G08G 1/0968 | (2006.01) |
| G05D 1/02 | (2020.01) |

(52) U.S. Cl.
CPC ........... *B60W 30/0956* (2013.01); *B60T 7/22* (2013.01); *B60T 8/4054* (2013.01); *B60W 50/0097* (2013.01); *G05D 1/0088* (2013.01); *G06V 20/584* (2022.01); *G08G 1/0129* (2013.01); *G08G 1/0133* (2013.01); *G08G 1/162* (2013.01); *G08G 1/166* (2013.01); *B60T 2201/022* (2013.01); *B60T 2201/083* (2013.01)

(58) Field of Classification Search
None
See application file for complete search history.

(56) References Cited

U.S. PATENT DOCUMENTS 7,991,551 B2 * 8/2011 Samuel ................. G08G 1/162
340/901
9,336,681 B2 5/2016 Annapureddy et al.
(Continued)

OTHER PUBLICATIONS

MobiSys '17, Jun. 19-23, 2017: BigRoad: Scaling Road Data Acquisition for Dependable Self-Driving by Liu et al.
(Continued)

*Primary Examiner* — Aniss Chad
*Assistant Examiner* — Madison R Hughes
(74) *Attorney, Agent, or Firm* — Snell & Wilmer LLP (57) ABSTRACT

A system for monitoring vehicle behavior based on vehicle control data includes a network access device configured to receive braking data from multiple vehicles, the braking data corresponding to vehicle braking events having a brake pressure that is equal to or greater than a threshold brake pressure and including a corresponding location. The system further includes a processor coupled to the memory and configured to determine an event of interest on a roadway by analyzing the braking data and the corresponding location, and to transmit a notification of the event of interest to at least one vehicle.

19 Claims, 7 Drawing Sheets

(56) References Cited

U.S. PATENT DOCUMENTS

| | | | |
|---|---|---|---|
| 9,361,802 B2 | 6/2016 | Milne et al. | |
| 9,805,601 B1* | 10/2017 | Fields | B60T 17/22 |
| 9,849,882 B2 | 12/2017 | Byun | |
| 10,037,695 B2 | 7/2018 | D'Amato et al. | |
| 10,118,613 B2 | 11/2018 | Kang et al. | |
| 2008/0284243 A1* | 11/2008 | Auer | B60R 21/013 |
| | | | 303/115.2 |
| 2015/0300828 A1 | 10/2015 | Tseng et al. | |
| 2016/0305388 A1* | 10/2016 | Miller | F02N 11/0818 |
| 2017/0263121 A1* | 9/2017 | Ono | G08G 1/096716 |
| 2017/0294119 A1* | 10/2017 | Tamura | G08G 1/164 |
| 2017/0369069 A1* | 12/2017 | Yen | B60T 7/18 |
| 2018/0162409 A1 | 6/2018 | Altmannshofer et al. | |
| 2019/0382029 A1* | 12/2019 | Golov | G06K 9/00805 |
| 2020/0201356 A1* | 6/2020 | Schuh | B60T 7/12 |
| 2020/0353938 A1* | 11/2020 | Stenneth | G07C 5/0816 |
| 2021/0035387 A1* | 2/2021 | Kuehnle | G08G 1/0133 |

OTHER PUBLICATIONS

The ACM Digital Library, 2019 ACM: An Early Warning Scheme for Broadcasting Critical Messages using VANET by Chou et al.
2016 8th IEEE: A Novel Rear-End Collision Warning Algorithm in VANET by Lv et al.
Amazonia Investiga, 2018: The insurance telematics as a tool to improve road safety in the context of the russian market of autoinsurance by Korneyko et al.
2017 IEEE: CrowdSafe: Detecting Extreme Driving Behaviors based on Mobile Crowdsensing by Guo et al.
2017 VLDB Endowment: CarStream: An Industrial System of Big Data Processing for Internet-of-Vehicles Zhang et al.
2016 IEEE: Autonomous Vehicles Safe-Optimal Trajectory Selection Based on Big Data Analysis and Predefined User Preferences by Najada et al.
2016 International Conference on Emerging Technological Trends [ICETT]: Real-Time Smart Traffic Management System for Smart Cities by Using Internet of Things and Big Data by Rizwan et al.

\* cited by examiner

BRAKING DATA MAPPING

BACKGROUND

1. Field

The present disclosure relates to systems and methods for monitoring vehicle behavior based on vehicle control data such as panic braking events.

2. Description of the Related Art

Currently, some navigation systems may identify traffic along a roadway. Some of these systems allow users to report the presence of accidents or distractions on the roadway (e.g., stopped vehicles). However, these systems are imprecise and may occasionally provide false information due to the imprecision of the methods used.

With the impending explosion of the Internet of Things (IOT), much information will be transmitted between devices. Of particular applicability, vehicles will be sending and receiving a vast amount of information. This information may include a variety of data such as image data, sensor data, and vehicle control data. Vehicle control data is data that relates to control of a vehicle. For example, vehicle control data may include brake information each time a vehicle brakes, acceleration information each time a vehicle accelerates, turn information each time a vehicle turns (e.g., via a steering wheel), or the like. This vehicle control data may be received from sensors that detect operation of the vehicular system, input devices that receive the vehicle control instructions (e.g., a brake pedal or a steering wheel), or the like. However, this information is not currently used (nor is it planned for use) to identify events of interest (e.g., accidents, traffic, inclement weather, etc.) along roadways.

Thus, there is a need in the art for systems and methods for monitoring vehicle behavior and identifying events of interest based on vehicle control data.

SUMMARY

Described herein is a system for monitoring vehicle behavior based on vehicle control data. The system includes a network access device configured to receive braking data from multiple vehicles, the braking data corresponding to vehicle braking events having a brake pressure that is equal to or greater than a threshold brake pressure and including a corresponding location. The system further includes a processor coupled to the memory and configured to determine an event of interest on a roadway by analyzing the braking data and the corresponding location, and to transmit a notification of the event of interest to at least one vehicle.

Also disclosed is a system for monitoring vehicle behavior based on vehicle control data in a vehicle. The system includes at least one of a brake sensor or a brake pedal configured to detect a vehicle braking event corresponding to a brake pressure that is equal to or greater than a threshold brake pressure. The system further includes a location sensor configured to detect a current location of the vehicle. The system further includes a network access device configured to communicate with a server. The system further includes an output device configured to output data. The system further includes an electronic control unit coupled to the at least one of the brake sensor or the brake pedal, the location sensor, the network access device, and the output device. The ECU is designed to transmit braking data to the server, the braking data including the vehicle braking event and a corresponding location of the vehicle during the vehicle braking event. The ECU is further designed to receive a notification of an event of interest at an event location from the server, the notification being generated based on the braking data from at least one of the vehicle or another vehicle. The ECU is further designed to control the output device to output the notification of the event of interest.

Also disclosed is a method for monitoring vehicle behavior based on vehicle control data. The method includes receiving, by a network access device, braking data from multiple vehicles, the braking data corresponding to vehicle braking events having a brake pressure that is equal to or greater than a threshold brake pressure and including a corresponding location. The method further includes determining, by a processor, an event of interest on a roadway by analyzing the braking data and the corresponding location. The method further includes transmitting, by the network access device, a notification of the event of interest to at least one vehicle.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for monitoring the status of a roadway based on vehicle control data, such as panic braking events. These systems provide several benefits and advantages such as identifying events of interest (e.g., accidents, traffic, or the like) based on unconventional data such as panic braking events. This advantageously provides redundant event identification beyond conventional methods such as traffic indicators on navigation systems. The system provides the additional benefit of being able to analyze historical vehicle control data to determine trends that indicate when an event of interest is likely to occur. This advantageously allows the system to predict events of interest before they occur, providing drivers with this information and allowing them to avoid the potential problem. Determining trends also advantageously allows the system to identify problematic areas, allows drivers to avoid problematic areas, and allows municipalities to correct any deficiencies of a road network. Vehicles included in the system are designed to take any of a number of actions to beneficially reduce the likelihood of any event causing a significant issue for the vehicle. For example, the vehicles can change any of a number of settings such as increasing a cruise control following distance, turning on traction control, or the like to reduce the likelihood of the vehicle becoming involved in an accident.

An exemplary system includes multiple vehicles designed to detect vehicle control data and to transmit the vehicle control data to a server. The system further includes the server which may include a memory, a network access device, and a processor. The network access device may receive the vehicle control data. The memory may store the vehicle control data for analysis by the processor. The processor may analyze the vehicle control data to determine if an event of interest has occurred at a specific location on a roadway. After determining an event of interest, the processor may control the network access device to transmit a notification of the event of interest to vehicles included in the system.

Figure 1:
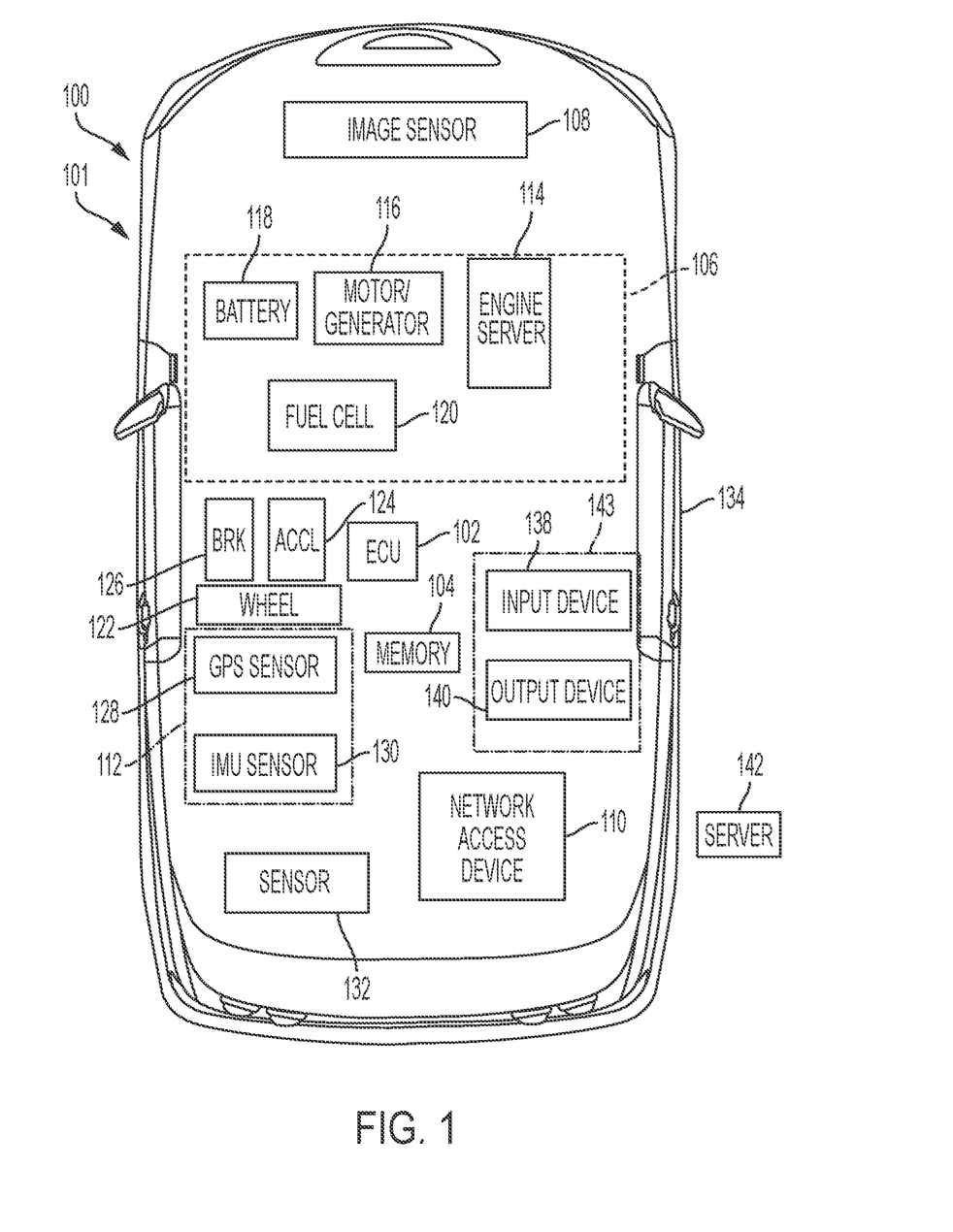
FIG. 1 is a block diagram illustrating a system and a vehicle for identifying events of interest based on vehicle behavior data according to an embodiment of the present invention.

Turning to FIG. 1, a vehicle 100 may include, or be a part of, a system 101 for monitoring vehicle behavior including braking events (e.g., "panic braking" events). A panic braking event may correspond to a vehicle brake action that includes braking beyond a threshold brake pressure and may indicate traffic, an accident, or the like. The system 101 may predict events of interest on a roadway based on the vehicle behavior and predict future events of interest based on trends in vehicle behavior. The vehicle 100 (or system 101) may include an ECU 102, a memory 104, a power source 106, and a main body 134. The vehicle 100 (or system 101) may further include a network access device 110, an image sensor 108, and a sensor 132. The vehicle may also include a multimedia unit 143 including an input device 138 and an output device 140. The vehicle 100 may further include vehicle controls such as a steering wheel 122, an acceleration pedal 124, and a brake pedal 126.

The main body 134 may be propelled along a roadway, may be suspended in or on water, or may fly through air. The main body 134 may resemble a vehicle such as a car, a bus, a motorcycle, a boat, an aircraft, or the like. The main body 134 may further support one or more individuals such as a driver, a passenger, or the like. The main body 134 may define a vehicle cabin (not shown).

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be operated in an autonomous, semi-autonomous, or fully driver-operated state. In that regard, the vehicle 100 may be operated independently of driver control and, from time to time, without a person inside or in the driver's seat of the vehicle 100. The ECU 102 may facilitate such autonomous functionality.

The ECU 102 may further adjust various vehicle settings based on various information. For example, the ECU 102 may adjust a traction control system of the vehicle, an all-wheel-drive system of the vehicle, a driving mode of the vehicle (e.g., ECO, normal, or sport mode), cruise control parameters of a cruise control system, or various responsiveness systems (e.g., steering, braking, or acceleration).

The memory 104 may include any non-transitory memory and may store data usable by the ECU 102. For example, the memory 104 may store map data, may store instructions usable by the ECU 102 to drive autonomously, may store detected or received vehicle control data (e.g., braking events of the vehicle 100), or the like.

The power source 106 may include any one or more of an engine 114, a motor-generator 116, a battery 118, or a fuel cell 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage devices including a battery, a flywheel, a super capacitor, a thermal storage device, or the like.

The fuel cell 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel cell 120 may be stored in the battery 118 and/or used by the motor-generator 116 or other electrical components of the vehicle 100. In some embodiments, the vehicle 100 may include multiple fuel cells including the fuel cell 120.

The motor-generator 116 may convert the electrical energy stored in the battery 118 (or electrical energy received directly from the fuel cell 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include any one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The image sensor 108 may be coupled to the main body 108 and may detect image data corresponding to an environment of the vehicle 100. For example, the image sensor 108 may include a camera, a radar detector, a lidar detector, or any other image sensor capable of detecting light having any wavelength.

The sensor 132 may include one or more of a sensor capable of detecting a status of a vehicle component, a sensor capable of detecting environmental conditions (including weather), or the like. The sensor 132 may include, for example, a voltage sensor, a current sensor, a temperature sensor, a pressure sensor, a fuel gauge, an airflow sensor, or an oxygen sensor. The sensor 132 may detect various information corresponding to vehicle control such as one or more of a requested amount of acceleration, a requested amount of braking, a requested steering direction of the vehicle 100, or the like. In that regard, the sensor 132 may be coupled to the steering wheel 122, the acceleration pedal 124, or the brake pedal 126. In various embodiments, the information detected by the sensor 132 may be compared to information received from the steering wheel 122, the acceleration pedal 124, or the brake pedal 126 to ensure the actual vehicle behavior corresponds to the requested vehicle behavior.

The input device 138 may include one or more input devices such as a button, a keyboard, a mouse, a touchscreen, a microphone, or the like. The input device 138 may receive input from a user of the vehicle 100 such as a driver or a passenger. The input device 138 may include any quantity of input devices which may also be considered vehicle controls. For example, the input device 138 may be designed to receive user-requested vehicle controls and may include a traction control input device (to address vehicle traction control), a driving mode input device (to select a driving mode such as ECO, normal, or sport mode), an all-wheel-drive input device (to engage or disengage an all-wheel-drive or four-wheel-drive system), a cruise control input device (to set or adjust vehicle cruise control), or steering, braking, and acceleration responsiveness input devices (to adjust responsiveness of these vehicle systems). In some embodiments, the network access device 110 may be considered an input device as it may receive input from a server 142 associated with a vehicle user.

The output device 140 may include any output device such as a speaker, a display, a touchscreen, or the like. The output device 140 may output data to a user of the vehicle such as a notification of an event of interest along a route of the vehicle. The output device 140 may output any information such as a navigation route, a warning, or the like. The network access device 110 may be considered an output device as it may transmit output data to the remote device 142, where it may be output to a vehicle user.

The network access device 110 may include any network access device capable of communicating via a wireless protocol. For example, the network access device 110 may communicate via Bluetooth®, Wi-Fi®, a cellular protocol, vehicle to vehicle (V2V) communications, Zigbee®, or any other wired or wireless protocol. The network access device 110 may be referred to as a data communication module (DCM) and may communicate with any device on the vehicle 100 and/or any remote device. For example, the network access device 110 may communicate with the remote server 142.

The ECU 102 may receive vehicle control data (which may relate to control of the vehicle) from one or more sensors or input devices of the vehicle 100. For example, the vehicle control data may include a requested or applied brake pressure (from the brake pedal 126 or a corresponding sensor), a requested or applied acceleration (from the acceleration pedal 124 or a corresponding sensor), a requested or applied steering control (from the steering wheel 122 or a corresponding sensor), or the like. The ECU 102 may analyze the vehicle control data or may transmit the vehicle control data to the remote server 142 for analysis. In some embodiments, the vehicle control data may further include a corresponding location detected by the location sensor 112. Although the present disclosure is directed to analysis by the remote server 142, one skilled in the art will realize that any analysis or action taken by the remote server 142 may also or instead be taken by the ECU 102.

The ECU 102 may analyze the vehicle control data to determine if any control data may be related to an event of interest. For example, the ECU 102 may receive information from the brake pedal 126. The ECU 102 may determine that the braking data should be sent to the remote server 142 only if the braking data corresponds to a vehicle braking event that has a brake pressure that is equal to or greater than a threshold brake pressure. The threshold brake pressure may be a brake pressure above which the braking event is considered to be caused by an external factor (rather than a typical braking event), and the braking event may be referred to as a panic braking event. A similar analysis may be performed for the acceleration data, the steering wheel data, or any other vehicle control data. In some embodiments, the threshold brake pressure may vary amongst vehicles. For example, the ECU 102 of each vehicle may learn each driver's driving style and may select the threshold brake pressure that best aligns with the specific driver. In that regard, a driver with an aggressive driving style may have a greater threshold brake pressure than a more reserved driver.

The remote server 142 may analyze the vehicle control data (including braking data) and may determine whether an event of interest has occurred. The remote server 142 may determine that an event of interest has occurred, for example, if multiple braking events have occurred at a specific location. In some embodiments, the remote server 142 may further determine the event of interest based on map information and points of interest. For example, if multiple braking events have occurred at a traffic light, then the remote server 142 may determine that no event of interest has occurred. On the other hand, if multiple braking events occurred along a highway then the remote server 142 may determine that an event of interest has occurred. The remote server 142 may adjust a quantity of braking events that result in a determination of an event of interest based on the roadway characteristics. For example, an event of interest may be determined if two braking events occurred on a highway, and if at least 10 braking events occurred at a stoplight.

An event of interest may include, for example, traffic, an accident, an object on a roadway, a disabled vehicle, a distraction along the roadway, an advertisement, sunlight reaching eyes of a driver on a roadway, or the like.

The remote server 142 may take any of a number of actions in response to determining an event of interest. For example, the remote server may transmit a notification to any vehicles that are approaching the location of the event of interest that the event of interest has occurred. In some embodiments, the remote server may determine a category (such as traffic, accident, or the like) of the event of interest and may further transmit the category to the vehicle(s). The remote server 142 may further determine an alternative navigation route that avoids the location of the event of interest, and may transmit the alternative route to the vehicle(s).

Figure 2:
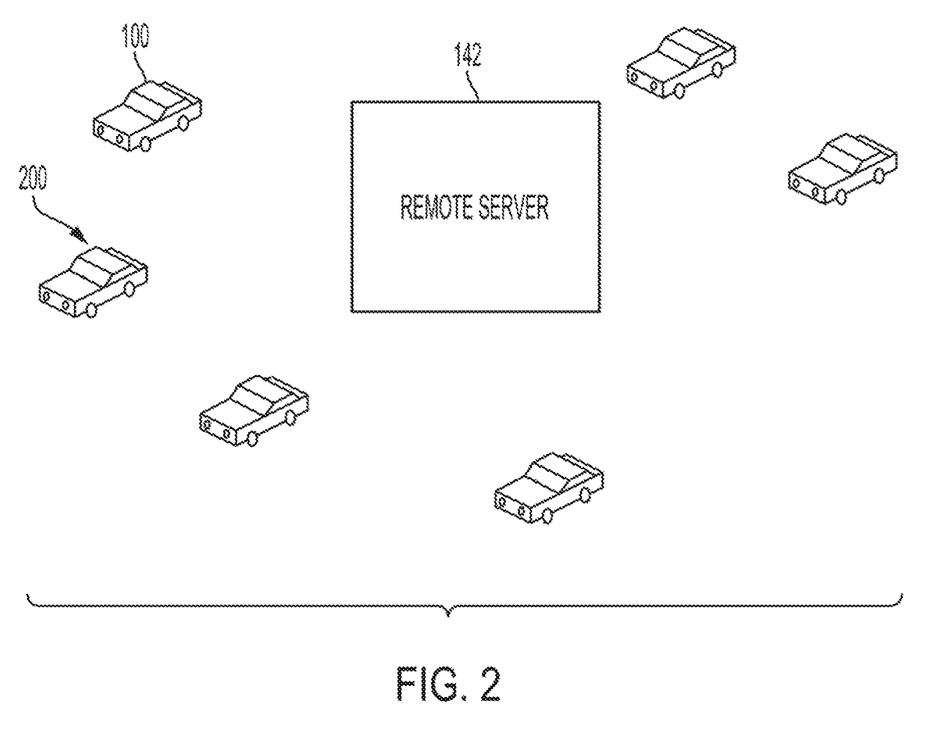
FIG. 2 is a block diagram illustrating a system for identifying events of interest based on vehicle behavior data according to an embodiment of the present invention.

Referring now to FIG. 2, the remote server 142 may communicate with multiple vehicles 200 including the vehicle 100. The remote server 142 may receive vehicle control data from some or all of the vehicles 200. The remote server 142 may aggregate the vehicle control data to identify events of interest that may be occurring, or may have occurred, at one or more locations on a roadway. The location may include a GPS location, an intersection, an address, a specific lane on the roadway, or the like. The remote server 142 may transmit a notification of any determined event of interest to any one or more of the vehicles 200 in the vicinity of the event of interest, vehicles 200 traveling on a route towards the location, or the like.

The remote server 142 may further analyze historical vehicle control data to determine trends in the vehicle control data that indicate when an event of interest will occur. For example, the remote server 142 may determine that an event of interest occurs in the summertime on a specific roadway heading west at around 8 PM. Based on this information, the remote server 142 may determine that the event of interest corresponds to sunlight reaching eyes of drivers. After making this determination, the remote server 142 may transmit a notification of the event of interest (e.g., saying that sunlight may obstruct the view of drivers) to vehicles 200 that are driving west on the roadway around 8 PM.

Figure 3:
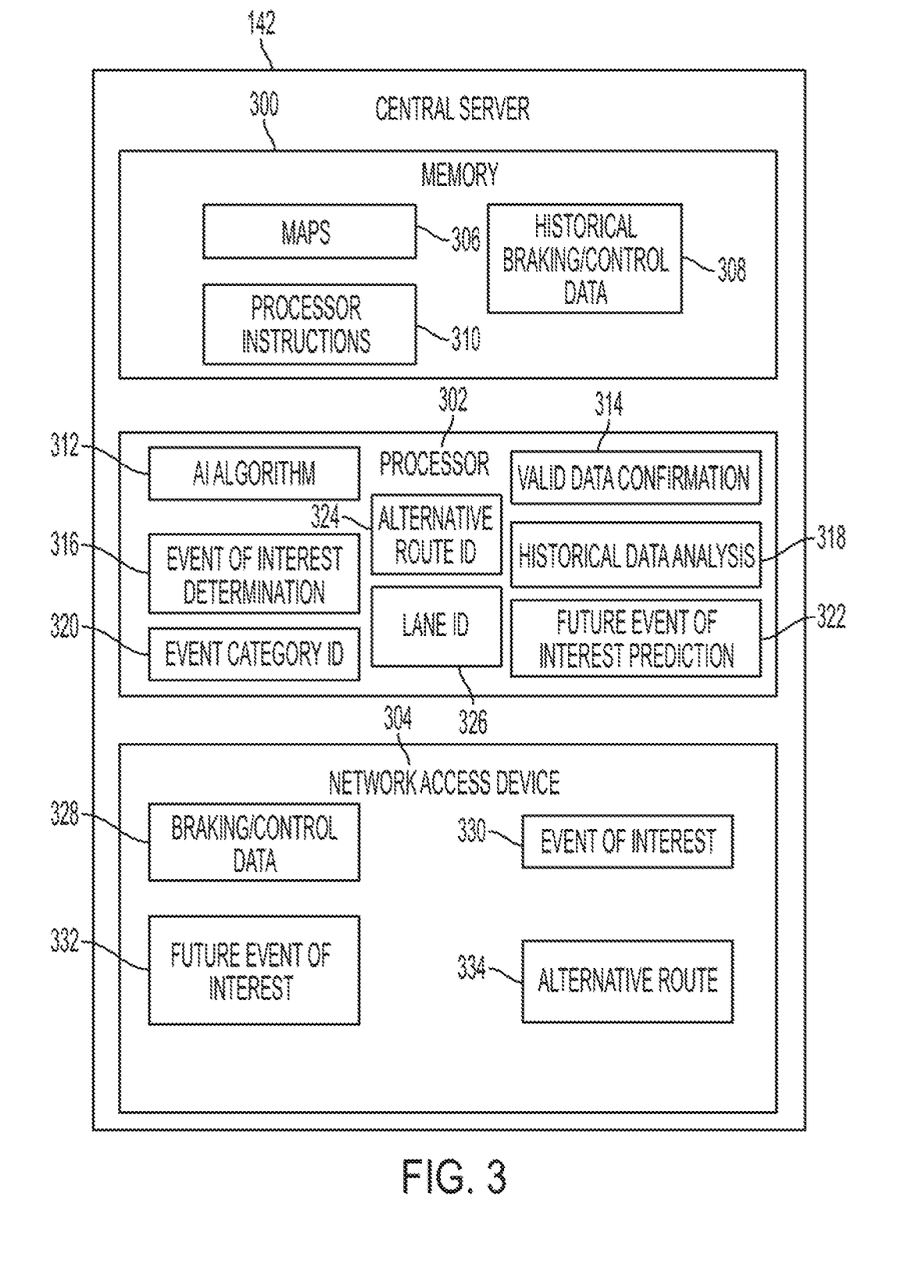
FIG. 3 is a block diagram illustrating additional features of a server of FIG. 2 according to an embodiment of the present invention.

Referring now to FIG. 3, additional details of the server 142 are shown. The server 142 may include a non-transitory memory 300, a controller or processor 302, and a network access device 304. The memory 300 may include any non-transitory memory capable of storing information. The processor 302 may include any processor, controller, or discrete logic device capable of performing logic-based functions. The network access device 304 may include any wired or wireless network access device capable of communicating with one or more vehicles (such as the vehicle 100 of FIG. 1) via any protocol such as Wi-Fi®, Bluetooth®, V2V communications, or the like.

The memory 300 may store map data 306. The map data 306 may include one or more maps of a location serviced by the server 142. The map data 306 may include, for example, roadways, street names, speed limits, intersections, locations of points of interest (including stop lights and stop signs), headings (e.g., heading degrees such as 300 degrees), or the like. The processor 302 may be capable of identifying a specific location in the map data 306 based on information received from vehicles such as GPS coordinates.

The memory 300 may further store historical braking data or vehicle control data 308. The historical vehicle control data 308 may include any vehicle control data received by the network access device 304. For example, as vehicle control data is received by the network access device 304, the processor 302 may control the memory 300 to store the vehicle control data as the historical vehicle control data 308. The processor 302 may later analyze the historical vehicle control data 308 to determine potential trends.

The memory 300 may also store processor instructions 310. The processor instructions 310 may include software or firmware usable by the processor 302 to perform any operations or algorithms of the processor 302.

The processor 302 may be an artificial intelligence processor, an application specific integrated circuit (ASIC), a general purpose processor, a field programmable gate array (FPGA), or any other discrete device capable of performing logic functions. The processor 302 may be designed to perform functions or algorithms using hardware, software, firmware, or any combination thereof.

The processor 302 may perform an artificial intelligence algorithm 312. The artificial intelligence algorithm 312 may be included as part of, or may assist with, any of the other algorithms performed by the processor 312. The artificial intelligence algorithm 312 may also or instead be used to improve operation of any other algorithms performed by the processor 312. For example, the algorithm 312 may improve the operation of an event of interest determination algorithm 316 to improve the accuracy of the determination of the events of interest. The algorithm 312 may be trained based on at least one of past or present data, including results of any one or more algorithms.

The processor 302 may further perform a valid data confirmation algorithm 314. The valid data confirmation algorithm 314 may identify whether vehicle control data received from one or more vehicles is applicable to be used in the determination of any event of interest. A vehicle may transmit braking data to the server 142 only if the braking data is determined to be applicable to an event of interest (e.g., if the braking data corresponds to a braking event having a brake pressure that is equal to or greater than a threshold brake pressure). The vehicle may transmit all braking data to the server 142 and the algorithm 314 may determine if each braking event has a brake pressure that is equal to or greater than the threshold brake pressure. In some embodiments, the vehicle or the server 142 may determine that braking data is only applicable to an event of interest if a braking event has a brake pressure that remains equal to or greater than the threshold brake pressure for at least a predetermined period of time. The predetermined period of time may correspond to an amount of time below which a braking event having a relatively great brake pressure may be considered accidental or not an indication of an event of interest.

The processor 302 may also perform an event of interest determination algorithm 316. The algorithm 316 may analyze all vehicle control data received by the server 142 to determine if any of the vehicle control data corresponds to an event of interest. Each element of vehicle control data (including braking data) may include a corresponding location at which the vehicle control event occurred. The location may include a single location (e.g., GPS coordinates), a collection of locations in close proximity (e.g., within 500 feet of each other), a collection of locations along a roadway (with or without a specific lane designation), or the like. The processor 302 may determine that an event of interest has occurred at one of these locations if a predetermined quantity of vehicle control data (which has been determined to be applicable to an event of interest) is received that corresponds to the location. The predetermined quantity may be a quantity of events that is sufficiently great to indicate that a nonroutine event (i.e., event of interest) has occurred.

The event of interest may include any nonroutine event on a roadway. For example, the event of interest may include an accident, traffic congestion, an object on the roadway, a disabled vehicle, a distraction along the roadway (e.g., a naked person sleeping on a median), a distracting advertisement, sunlight shining through vehicle windshields into eyes of drivers, or the like.

The processor 302 may further perform a historical data analysis algorithm 318. The historical data analysis algorithm 318 may analyze the historical vehicle control data 308 to determine various types of trends corresponding to the vehicle control data. The processor 302 may analyze the historical data 308 to determine which trends in the data indicate a certain category of event of interest. For example, the processor 302 may determine that vehicles in multiple lanes that exhibit panic braking (e.g., braking greater than a threshold brake pressure) indicate the presence of an accident, and that vehicles in multiple lanes that exhibit panic braking to a lesser degree indicate the presence of sunlight in eyes of drivers. The algorithm 318 may determine this information based on the historical vehicle control data 308 along with other public information such as accident reports, weather reports, or the like. An event category identification algorithm 320 may use this information to determine a category of a specific event of interest.

The processor 302 may also analyze the historical data 308 to determine which trends in the data indicate that an event of interest may be forthcoming. For example, the algorithm 318 may determine that braking events occur on a specific stretch of roadway at 7 PM on every day in July and August (e.g., corresponding to sunlight in eyes of drivers). As another example, the algorithm 318 may determine that braking events occur on another roadway within 30 minutes after traffic begins accumulating on the roadway (e.g., indicating that accidents are common during times of heavy traffic on the roadway). A future event of interest prediction algorithm 322 may use this information to predict future events of interest.

The event category identification algorithm 320 may utilize the vehicle control data 328, a determined event of interest from the algorithm 316, and the learned trends from the algorithm 318 to determine a category for a specific event of interest. Continuing an example from above, if the vehicle control data 328 indicates that multiple vehicles in multiple lanes exhibit panic braking to a relatively great degree then the algorithm 320 may determine that an accident has occurred at a corresponding location.

The future event of interest prediction algorithm 322 may utilize the vehicle control data 328, a determined event of interest from the algorithm 316, and the learned trends from the algorithm 318 to predict future events of interest. For example, if traffic begins building on a roadway in which accidents typically occur within 30 minutes of traffic accumulation, the algorithm 322 may predict that an accident will occur on the specific roadway within 30 minutes of traffic accumulation.

The processor 302 may further perform an alternative route identification algorithm 324. The algorithm 324 may be used by the processor 302 to identify an alternative route for one or more vehicles that is traveling towards a determined event of interest. For example, the processor 302 may determine an alternative route for each vehicle traveling towards the event in response to a vehicle requesting an alternative route. The processor 302 may be aware of current routes of some or all vehicles, may be provided the current routes by the one or more vehicles, or the like. The processor 302 may further determine alternative routes that avoid any events of interest, that avoid locations that are likely to experience events of interest, or the like.

The processor 302 may further be capable of performing a lane identification algorithm 326. The algorithm 326 may analyze the vehicle control data 328 to determine a lane on a roadway in which an event of interest has occurred. The algorithm 326 may determine the specific lane based on any information such as the locations associated with vehicle control data, by accessing cameras directed on the roadway (e.g., traffic cameras), or the like.

The network access device 304 may communicate with multiple vehicles in an area serviced by the server 142. The network access device 304 may communicate via any known wired or wireless protocol such as Wi-Fi®, Bluetooth®, V2V communications, or the like. The network access device 304 may transmit and receive various pieces of information. For example, the network access device 304 may receive vehicle control data 328 including braking data. The vehicle control data 328 may be received from one or more vehicles and may include any information relating to control of the vehicle. In particular, the vehicle control data 328 may include vehicle braking data (including requested braking pressure or actual braking pressure), steering control data (including requested steering control or actual steering control), acceleration data (including requested acceleration or actual acceleration), or the like.

The network access device 304 may transmit event of interest information 330 to one or more vehicles that are approaching the event of interest. As the server 142 determines that an event of interest has occurred, the server 142 may determine which vehicles are approaching a location corresponding to the event of interest. The server 142 may then transmit the information 330 corresponding to the event of interest to each vehicle that is approaching the location. The event of interest information 330 may further include a category of the event of interest, along with a corresponding location, duration of the event, or the like.

The network access device 304 may also transmit future event of interest information 332. When the server 142 predicts that an event of interest will occur at a specific location, the server 142 may transmit the future event of interest information 332 to any vehicle that is approaching or driving on a route that travels through a location of the future event of interest. In some embodiments, the information 332 may further include a category of the future event of interest along with a corresponding location, predicted duration of the event, or the like.

The network access device 304 may further transmit alternative route information 334 to any vehicle that is approaching or driving on a route that travels through a location of an event of interest or a future event of interest. The alternative route information 334 may include one or more alternative routes that takes each vehicle to their destination while avoiding locations associated with events of interest or predicted events of interest. In some embodiments, the vehicles themselves may determine alternative routes rather than receive alternative routes from the server 142.

Figure 4:
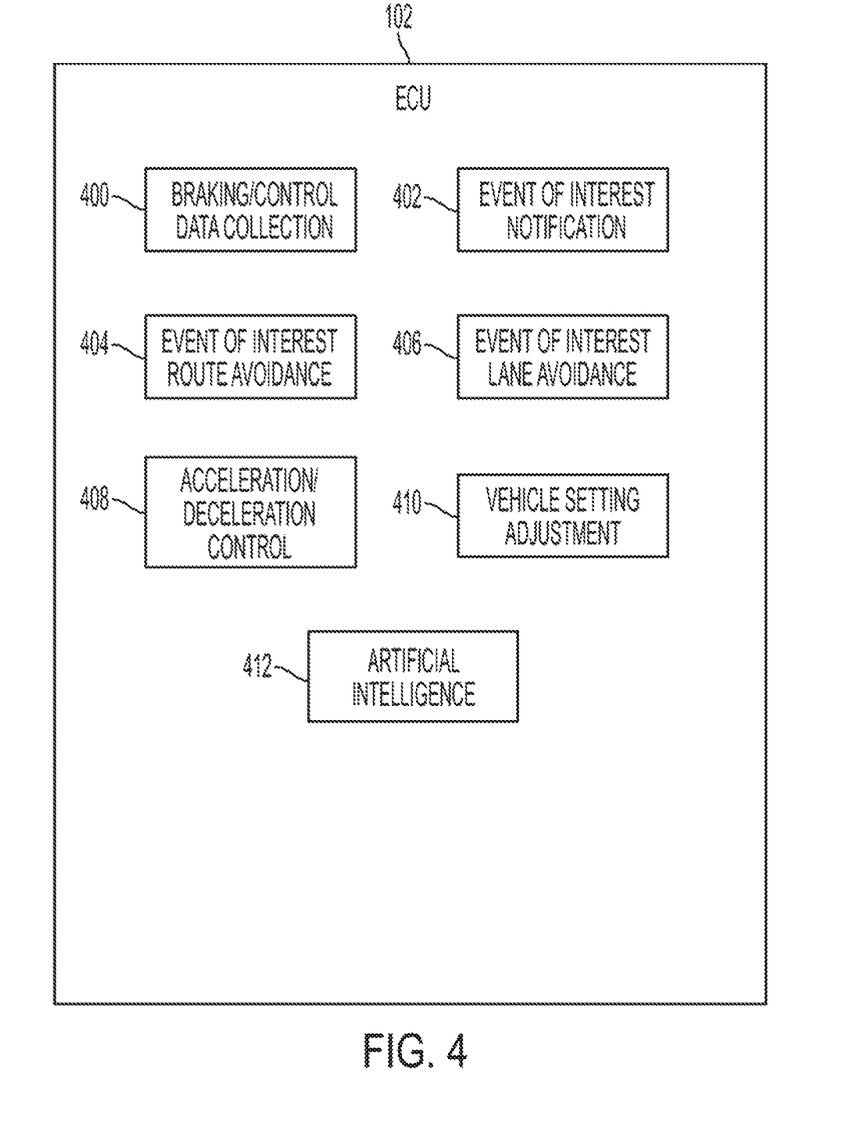
FIG. 4 is a block diagram illustrating additional features of the vehicle of FIG. 1 according to an embodiment of the present invention.

Referring now to FIG. 4, additional details of the ECU 102 are shown. The ECU 102 may be designed to perform various functions such as navigation determination, autonomous driving functions, or the like. One skilled in the art will realize that the ECU 102 is capable of performing additional functions than those shown in FIG. 4, and that some functions of FIG. 4 may or may not be performed by the ECU 102.

The ECU 102 may perform a braking data or vehicle control data collection algorithm 400. The ECU 102, using the algorithm 400, may collect any vehicle control data (including braking data). The algorithm 400 may determine whether any vehicle control data satisfies certain requirements (e.g., that any braking data corresponds to a brake event having at least a predetermined brake pressure for a predetermined period of time). Any vehicle control data that satisfies the requirements may be assigned as vehicle control data and may be transmitted to a remote server.

The ECU 102 may further perform an event of interest notification algorithm 402. If the remote server or the ECU 102 identifies that an event of interest has occurred (or that a future event of interest is likely to occur) then the ECU 102 may control an output device of the vehicle to output a notification of the event of interest. The notification may include an audio notification, a visual notification, a notification that a new route is being provided that avoids an event of interest, or the like. The notification may further include an identification of the category of the event of interest.

The ECU 102 may further perform an event of interest route avoidance algorithm 404. The algorithm 404 may identify an alternative route for the vehicle that goes to a previously identified destination (or a predicted destination) while avoiding any present or predicted events of interest. In some situations, the algorithm 404 may output information related to the event of interest along with a proposed new route, and a driver may accept or maintain a current route or switch to the new route. In embodiments in which the vehicle is driven autonomously, the algorithm 404 may automatically change a current route of the vehicle.

The ECU 102 may also perform an event of interest lane avoidance algorithm 406. The lane avoidance algorithm 406 may identify a current lane traveled by the vehicle, identify a lane associated with an event of interest, and take an action if the current lane of the vehicle is the same as the lane of the event of interest. For example, the algorithm 406 may control an output device to output a notification that the vehicle should change lanes to avoid the lane of interest. As another example, if the vehicle is being driven autonomously, the algorithm 406 may automatically move the vehicle to a different lane to avoid the lane associated with the event of interest. In some embodiments, the algorithm 406 may provide instructions (or control the vehicle) to move to the furthest lane from the lane associated with the event of interest.

The ECU 102 may further perform a vehicle acceleration/deceleration control algorithm 408. The algorithm 408 may be performed, for example, in an autonomous vehicle, in a vehicle that utilizes adaptive cruise control, or the like. The algorithm 408 may adjust an acceleration or deceleration of the vehicle in order to avoid complications with an event of interest. For example, if the ECU 102 received notification that the vehicle is approaching an event of interest, the algorithm 408 may control the vehicle to slow down to reduce the likelihood of the event of interest causing the vehicle to become involved in an accident.

The ECU 102 may also perform a vehicle setting adjustment algorithm 410. The algorithm 410 may adjust various settings of the vehicle based on an upcoming event of interest or predicted event of interest. These settings to be changed may relate to a traction control system of the vehicle, an all-wheel-drive (including a four-wheel-drive) system of the vehicle, the driving mode of the vehicle (e.g., switching from sport mode to normal mode), a cruise control following distance of the vehicle, a steering responsiveness of the vehicle (e.g., making the vehicle more responsive to steering wheel movements), a braking responsiveness of the vehicle (e.g., making the vehicle more responsive to braking), or an acceleration responsiveness of the vehicle (e.g., making the vehicle more responsive to acceleration). The algorithm 410 may adjust any settings related to these systems based on the upcoming event of interest. For example, the ECU 102 may turn on a traction control system of the vehicle before the vehicle reaches the event of interest, which is advantageous if the event is interest is weather-related. As another example, the ECU 102 may increase a cruise control following distance to cause the vehicle to remain farther behind a leading vehicle before the vehicle reaches the event of interest to decrease the likelihood of the vehicle being involved in an accident.

The ECU 102 may further perform an artificial intelligence algorithm 412. The artificial intelligence algorithm 412 may be included as part of, or may assist with, any of the other algorithms performed by the ECU 102. The artificial intelligence algorithm 412 may also or instead be used to improve operation of any other algorithms performed by the ECU 102. For example, the algorithm 412 may improve the operation of the vehicle setting adjustment algorithm 410 to optimize setting selection for each event of interest. The algorithm 412 may be trained based on at least one of past or present data, including results of any one or more algorithms.

Figure 5A:
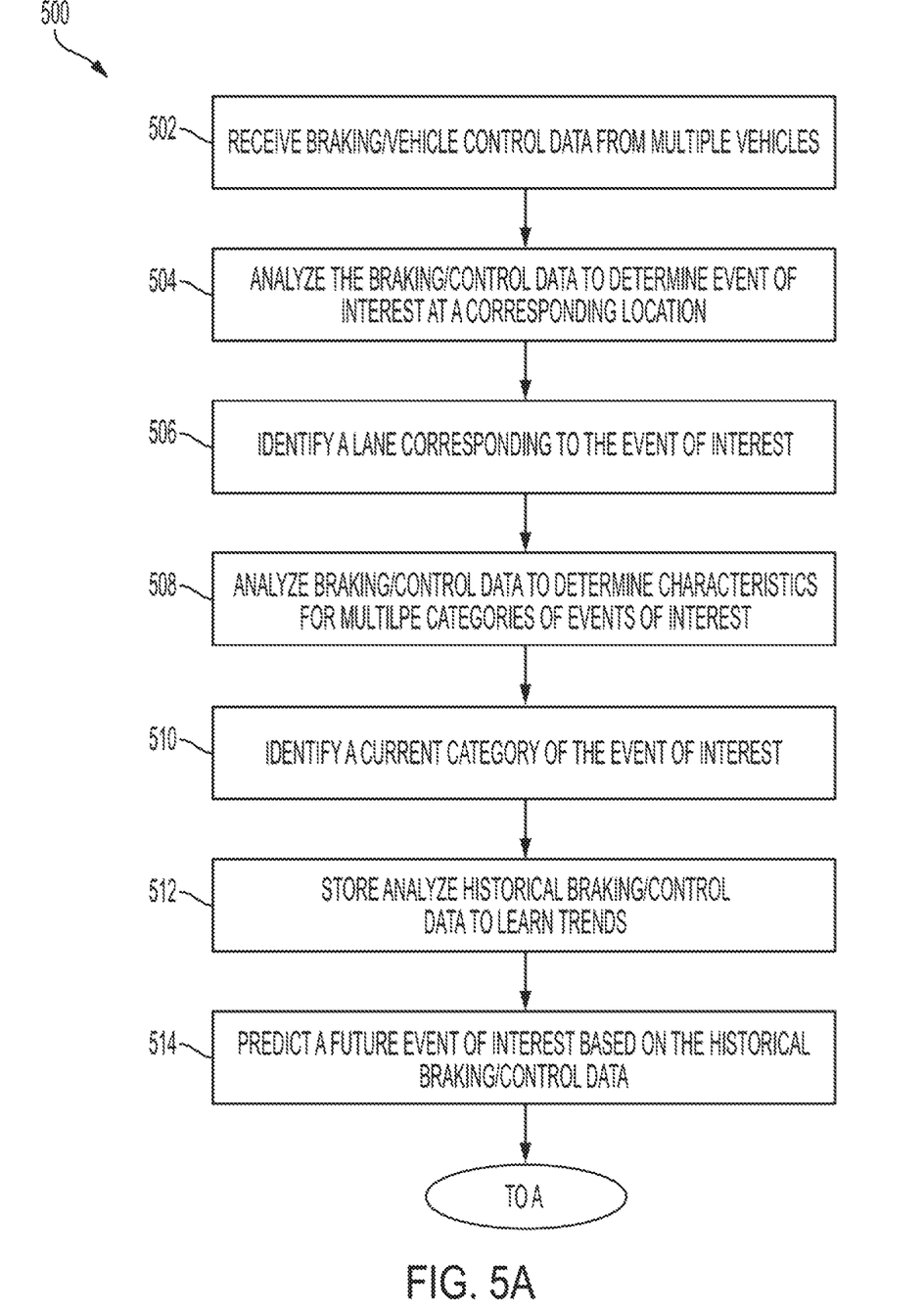
FIGS. 5A and 5B are flowcharts illustrating a method for identifying events of interest based on vehicle control data according to an embodiment of the present invention.
Figure 5B:
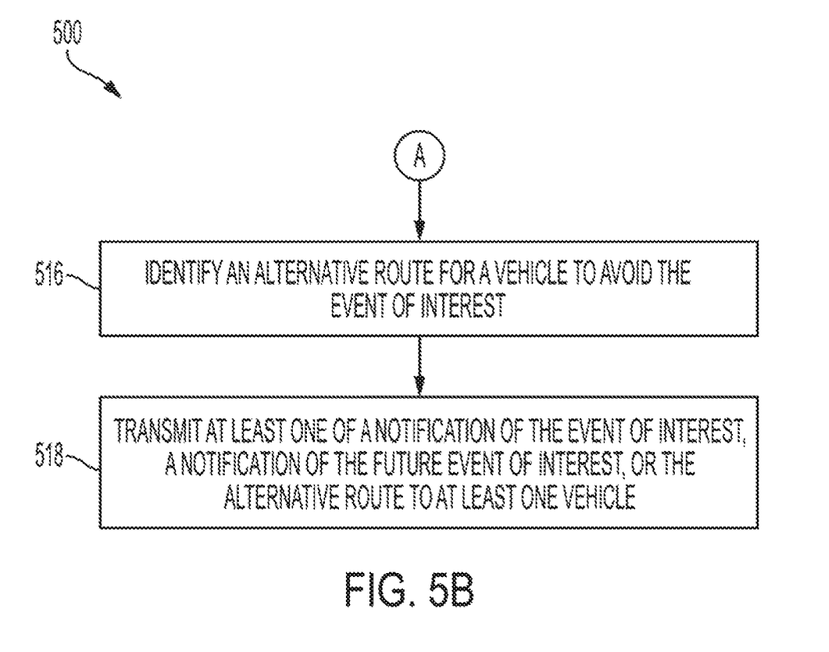

Turning now to FIGS. 5A and 5B, a method 500 for monitoring vehicle behavior based on vehicle control data is shown. The method 500 may be performed by a system similar to the system 101 of FIG. 1.

In block 502, a server may receive vehicle control data, including braking data, from multiple vehicles. The multiple vehicles may be associated with the server. In some embodiments, the server may perform the method 500 for a specific geographical area.

In block 504, a processor of the server may analyze the vehicle control data to determine or identify an event of interest at a location. For example, the processor may collect all vehicle control data, may determine how many vehicle control data entries are received at each location, and may tally the total at each location. If the quantity of entries at any location reach or exceed a threshold quantity then the processor may determine that an event of interest has occurred at the location. The threshold quantity may be a quantity of entries that indicate that an event of interest is likely to have occurred. For example, the threshold quantity may be 5 entries, 10 entries, 20 entries, or the like. In some embodiments, additional information may be used to verify the event of interest. The additional information may include image data from a vehicle camera, image data from a public camera (e.g., a red-light camera), traffic data, or the like.

In block 506, the processor may identify a lane corresponding to the event of interest. For example, the vehicle control data may include GPS information which the processor may use to identify a lane associated with each vehicle control data entry. For example, if multiple vehicle control data entries exist for a right lane on a roadway and only one vehicle control data entry exists for a left lane then the processor may determine that the event of interest occurred on the right lane. The processor may receive and analyze additional information such as image data from one or more vehicle cameras, image data from a public camera, or the like.

In block 508, the processor may analyze the vehicle control data to determine characteristics for multiple categories of events of interest. Block 508 may be performed as part of a machine learning algorithm such that the vehicle control data and other public and private data is periodically, continuously, or from time to time analyzed. A list of characteristics for each category of event of interest may be stored in a memory control data may be compared to the list to identify a corresponding category.

In block 510, the processor may identify a category of a present event of interest. For example, the processor may compare characteristics of vehicle control data at a specific location to the characteristics determined in block 508. If a match is made then the processor may determine that the present event of interest corresponds to the matched category.

In block 512, the processor may control a memory to store historical vehicle control data. The historical vehicle control data may be stored as it is received or at a later point in time. The historical vehicle control data may be stored continuously, periodically, or from time to time. The processor may further analyze the historical vehicle control data to identify trends that indicate a forthcoming event of interest. For example, the processor may learn that a relatively low quantity of braking data entries that do not meet the predetermined quantity of vehicle control entries on a given roadway indicate that traffic on the roadway is forthcoming. This information may be used to later predict traffic on the roadway based on a relatively low quantity of braking data entries.

In block 514, the processor may predict a future event of interest based on the historical vehicle control data, present vehicle control data, and the trends learned in block 512. Continuing the above example, if the relatively low quantity of braking data entries are detected on the specific roadway then the processor may predict that traffic will occur on the roadway.

In block 516, the processor may identify or determine an alternative route for any vehicles traveling to the location of a determined present or future event of interest. The alternative routes may cause the vehicles to avoid the event of interest.

In block 518, the processor may control a network access device of the server to transmit information relating to the event of interest to one or more vehicles that is approaching the event of interest. The information may include a notification of the event of interest which may or may not include a specific location associated with the event of interest and a category of the event of interest. The information may further include a notification of a future event of interest which likewise may or may not include a specific location and a category. The information may further include the alternative route that was determined in block 516.

Figure 6:
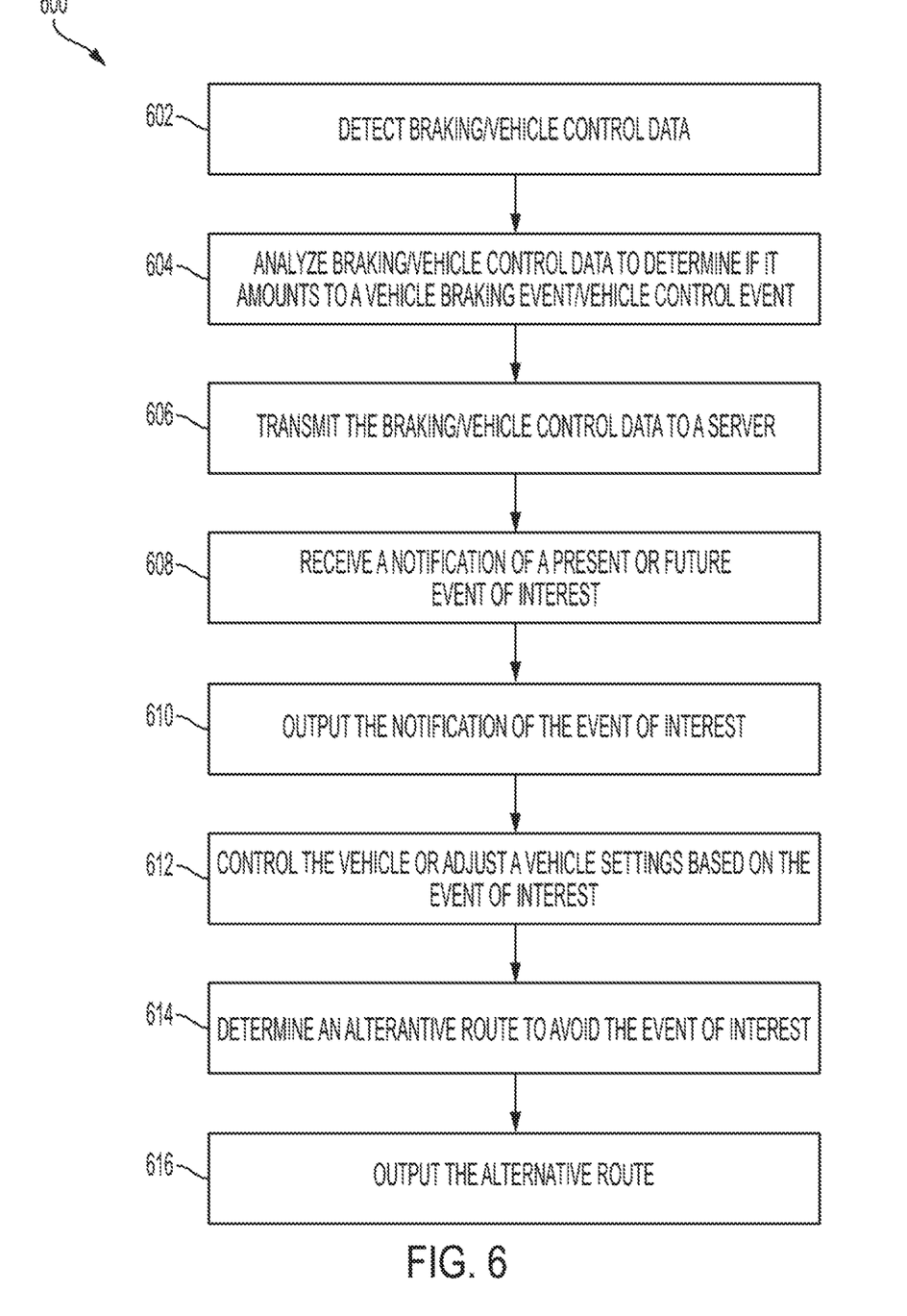
FIG. 6 is a flowchart illustrating a method for collecting data usable to identify an event of interest and taking actions based on a determined event of interest according to an embodiment of the present invention.

Referring now to FIG. 6, a method 600 may be performed by a vehicle to aid in determining events of interest and take an action in response to being notified of an event of interest. The method 600 may be performed by a vehicle similar to the vehicle 100 of FIG. 1.

In block 602, an ECU of the vehicle may receive or detect vehicle control data. The vehicle control data may include any data relating to control of the vehicle such as braking control data, steering data, acceleration control data, or the like. The vehicle control data may include data detected by a sensor (such as a brake sensor designed to detect an amount of brake pressure), an input device (such as a brake pedal), or a combination thereof.

In block 604, the ECU may analyze the vehicle control data to determine if the vehicle control data amounts to a vehicle control data event. For example, the ECU may determine that braking data corresponding to a braking event equal to or greater than a threshold braking pressure and lasting at least a predetermined amount of time amounts to a vehicle control data event. As another example, the ECU may determine that steering data corresponding to a steering event equal to or greater than a threshold turn radius and lasting at least a predetermined distance amounts to another vehicle control data event.

In block 606, the ECU may control a network access device of the vehicle to transmit the vehicle control data (that which amounts to a vehicle control data event) to a server. In some embodiments, the ECU may transmit all vehicle control data to the server and the server may determine whether the data corresponds to a vehicle control data event.

In block 608, the ECU may receive (via the network access device of the vehicle) a notification of a present or future event of interest in the vicinity of the vehicle. For example, the ECU may receive notifications for any events within 1 mile, half of a mile, or the like of the vehicle, may receive notifications for any event along a present route of the vehicle, or the like.

In block 610, the ECU may control an output device of the vehicle to output a notification corresponding to the event of interest. For example, the notification may be output as audio (e.g., voice data such as "be careful for the next 2 miles"), image data (e.g., text data such as "potential accident 1 mile ahead"), or any combination thereof.

In block 612, the ECU may control the vehicle or may adjust a vehicle setting based on the upcoming event of interest. For example, an autonomous vehicle may change routes or lanes of the vehicle to avoid the event of interest. As another example, a vehicle being driven using cruise control may increase a cruise control following distance to reduce the likelihood of an accident. As yet another example, the ECU may turn on traction control of the vehicle to reduce the likelihood of an accident during inclement weather.

In block 614, the ECU may determine an alternative route to a destination that avoids the event of interest. In some embodiments, the alternative route may be received from the server.

In block 616, the ECU may control an output device to output the alternative route. The output may include audio, image data, or both.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for monitoring vehicle behavior based on vehicle control data, the system comprising:
    a data communication module configured to receive braking data from multiple vehicles, the braking data corresponding to vehicle braking events having a brake pressure that is equal to or greater than a threshold brake pressure and including a corresponding location; and
    a processor coupled to the data communication module and configured to:
        determine an event of interest on a roadway by analyzing the braking data and the corresponding location when a quantity of vehicle braking events at the corresponding location is greater than or equal to a threshold event quantity, the threshold event quantity configured to be adjusted based on the corresponding location,
        transmit a notification of the event of interest to at least one vehicle, and transmit instructions to an electronic control unit (ECU) of the at least one vehicle to change a current lane of the at least one vehicle to avoid a lane associated with the event of interest.

2. The system of claim 1 wherein the processor is further configured to analyze historical braking data over a period of time to determine braking data characteristics for multiple categories of events of interest.

3. The system of claim 2 wherein the processor is further configured to identify a current category of the event of interest based on a comparison of the braking data to the braking data characteristics.

4. The system of claim 2 wherein the multiple categories of events include at least one of an accident, traffic congestion, an object on the roadway, a disabled vehicle, a distraction along the roadway, an advertisement, or sunlight shining through a windshield of a vehicle.

5. The system of claim 1 wherein the braking data is only generated in response to the vehicle braking events having the brake pressure that is equal to or greater than the threshold brake pressure and remains equal to or greater than the threshold brake pressure for at least a predetermined amount of time.

6. The system of claim 1 further comprising a memory configured to store historical braking data, wherein the processor is further configured to predict a future event of interest based on the historical braking data and to control the data communication module to transmit a notification of the future event of interest to the at least one vehicle.

7. The system of claim 6 wherein the processor is further configured to identify an alternative route for the at least one vehicle that avoids the corresponding location of the future event of interest, and to control the data communication module to transmit the alternative route to the at least one vehicle.

8. The system of claim 1 wherein the data communication module is further configured to receive additional vehicle data including steering data and acceleration data, and the processor is further configured to determine the event of interest based on the additional vehicle data.

9. The system of claim 1 wherein the processor is further configured to identify the lane on the roadway associated with the event of interest, and the notification of the event of interest includes an identifier of the lane.

10. A system for monitoring vehicle behavior based on vehicle control data in a vehicle, the system comprising:
at least one of a brake sensor or a brake pedal configured to detect a vehicle braking event corresponding to a brake pressure that is equal to or greater than a threshold brake pressure;
a location sensor configured to detect a current location of the vehicle;
a data communication module configured to communicate with a server;
an output device configured to output data; and
an electronic control unit coupled to the at least one of the brake sensor or the brake pedal, the location sensor, the data communication module, and the output device and configured to:
transmit braking data to the server, the braking data including the vehicle braking event and a corresponding location of the vehicle during the vehicle braking event,
receive a notification of an event of interest at an event location from the server, the notification being generated based on the braking data from at least one of the vehicle or another vehicle when a quantity of vehicle braking events at the corresponding location is greater than or equal to a threshold event quantity, the threshold event quantity configured to be adjusted based on the corresponding location,
control the output device to output the notification of the event of interest, and
change a current lane of the vehicle to avoid a lane associated with the event of interest.

11. The system of claim 10 wherein the braking data is only transmitted in response to the vehicle braking event having the brake pressure that is equal to or greater than the threshold brake pressure and remains equal to or greater than the threshold brake pressure for at least a predetermined amount of time.

12. The system of claim 10 wherein the ECU is further configured to decelerate the vehicle prior to reaching the event location.

13. The system of claim 10 wherein the ECU is further configured to adjust at least one of a traction control system of the vehicle, an all-wheel-drive system of the vehicle, a driving mode of the vehicle, a cruise control following distance of the vehicle, a steering responsiveness of the vehicle, a braking responsiveness of the vehicle, or an acceleration responsiveness of the vehicle based on the event of interest.

14. The system of claim 10 wherein the ECU is further configured to control the output device to output a route that avoids the event location.

15. A method for monitoring vehicle behavior based on vehicle control data, the method comprising:
receiving, by a network access device, braking data from multiple vehicles, the braking data corresponding to vehicle braking events having a brake pressure that is equal to or greater than a threshold brake pressure and including a corresponding location;
determining, by a processor, an event of interest on a roadway by analyzing the braking data and the corresponding location when a quantity of vehicle braking events at the corresponding location is greater than or equal to a threshold event quantity, the threshold event quantity configured to be adjusted based on the corresponding location
transmitting, by the network access device, a notification of the event of interest to at least one vehicle; and
changing, by an electronic control unit (ECU), a current lane of the at least one vehicle to avoid a lane associated with the event of interest.

16. The method of claim 15 further comprising analyzing, by the processor, historical braking data over a period of time to determine braking data characteristics for multiple categories of events of interest.

17. The method of claim 16 further comprising identifying, by the processor, a current category of the event of interest based on a comparison of the braking data to the braking data characteristics.

18. The method of claim 15 wherein the braking data is only generated in response to the vehicle braking events having the brake pressure that is equal to or greater than the threshold brake pressure and remains equal to or greater than the threshold brake pressure for at least a predetermined amount of time.

19. The method of claim 15 further comprising:
storing, in a memory, historical braking data;
predicting, by the processor, a future event of interest based on the historical braking data; and
transmitting, by the network access device, a notification of the future event of interest to the at least one vehicle.

* * * * *